Patented Aug. 28, 1951

2,566,255

UNITED STATES PATENT OFFICE 2,566,255

PARTIALLY HYDROLYZED INTERPOLYMERS OF ACRYLONITRILE WITH VINYL ESTERS AND PRODUCTS THEREFROM

Albert F. Smith and Halsey B. Stevenson, Wilmington, Del., assignors to E. I. du Pont de Nemours & Company, Wilmington, Del., a corporation of Delaware No Drawing. Application April 16, 1946, Serial No. 662,608

12 Claims. (Cl. 260—85.5)

This invention relates to vinyl polymers containing nitrile and hydroxyl groups and more particularly to dimethyl formamide-soluble, partially hydrolyzed interpolymers of acrylonitrile with a readily hydrolyzable vinyl ester of an organic carboxylic acid. Still more particularly this invention relates to oriented filaments and pellicles obtained from polymeric materials containing both hydroxyl and nitrile groups.

This application is a continuation-in-part of our copending application Serial No. 512,842, filed December 3, 1943, now abandoned.

Synthetic polymeric materials have found application for many uses. In particular, such synthetic polymers which have film-forming characteristics, or polymers which may be oriented into fibers of sufficient strength to give filaments, fabrics, etc., or other products have been found useful. The usefulness of polymers in fibers for many applications is directly related to various characteristics of the polymers such as, for example, resistance to elevated temperatures (of importance in the ironing of fabrics), solvent resistance, water resistance, or ability to withstand light or outdoor exposure. In general, hydroxylated polymers such as, for example, those obtained by the hydrolysis of polyvinyl esters, have suffered from poor water resistance and many of the vinyl polymers have low melting points which preclude their use where ironing of the fabric would be necessary.

It is an object of this invention to provide useful vinyl interpolymers which contain substantial amounts of hydroxyl and nitrile groups. A further object is the preparation of interpolymers which are substantially insensitive to water and to the more common organic solvents. A still further object is the preparation of pellicles and filaments from these interpolymers. A still further object is the preparation of oriented pellicles and filaments which are substantially resistant to outdoor exposure. Additional objects will become apparent from an examination of the following description and claims.

These and other objects and advantages are accomplished according to the herein described invention, which comprises a macromolecular, partially hydrolyzed interpolymer of acrylonitrile with a vinyl ester of an organic monocarboxylic acid, said hydrolyzed interpolymer being soluble in dimethyl formamide, having substantial wet strength when in the form of an untreated pellicle and having the empirical formula $(C_2H_3CN)_a \cdot (C_2H_3COOH)_b \cdot (C_2H_3OH)_c \cdot (C_2H_3OR)_d$ in which R is an acyl radical of an acid having the general formula R'COOH, wherein R' is of the group consisting of hydrogen atoms and hydrocarbon radicals, free from any unsaturated linkage between acyclic carbon atoms, in which any carbon atom alpha to the carbon atom in the carboxyl group of said acid is attached to at least one but not more than three carbon atoms and $a$, $b$, $c$ and $d$ are numbers, the ratio of $a+b$ to $c+d$ being within the range of from 1:10 to 10:1, the ratio of $a$ to $b$ being at least 3:1 and the ratio of $c$ to $d$ being within the range of from 3:17 to 3:1.

One preferred embodiment of this invention consists of a filament comprising essentially a macromolecular, partially hydrolyzed interpolymer of acrylonitrile with a vinyl ester of an organic monocarboxylic acid as hereinbefore defined, said filament showing orientation along the filament axis. Another preferred embodiment of this invention consists in a pellicle comprising essentially said partially hydrolyzed interpolymer, said pellicle showing orientation along the pellicle axis.

The hereinbefore defined macromolecular, partially hydrolyzed interpolymer can be obtained by partially hydrolyzing a solid, macromolecular interpolymer of acrylonitrile with a vinyl ester, said interpolymer having the empirical formula $(C_2H_3CN)_x \cdot (C_2H_3OR)_y$, in which R is an acyl radical of an acid having the general formula R'COOH, wherein R' is of the group consisting of hydrogen atoms and hydrocarbon radicals, free from any unsaturated linkages between acyclic carbon atoms, in which any carbon atom alpha to the carbon atom in the carboxyl group of said acid is attached to at least one but not more than three carbon atoms and $x$ and $y$ are numbers, the ratio of $x$ to $y$ being within the range of from 1:10 to 10:1. Said interpolymer is prepared most advantageously according to the processes described in copending U. S. applications Serial No. 458,711, filed September 17, 1942, now U. S. Patent 2,486,241, and Serial No. 497,056, filed August 2, 1943, now U. S. Patent 2,436,926. Said interpolymer, having the hereinbefore defined empirical formula $(C_2H_3CN)_x \cdot (C_2H_3OR)_y$, can be partially hydrolyzed according to any process which will partially hydrolyze a solid, macromolecular homopolymer of the vinyl ester contained therein. Thus, said interpolymer can be partially hydrolyzed by heating the same dispersed or dissolved in a primary alcohol that is liquid at 25° C., such as methanol or ethanol, containing a suitable hydrolyzing agent or catalyst. The resulting partially hydrolyzed interpolymer can then be separated and dried and formed into a pellicle or filament, particularly by dry spinning from a foramide type of solvent. Alternatively, the acrylonitrile/vinyl organic ester interpolymer may be dissolved, as in acetone, and the resultant solution dry spun to obtain a filament or pellicle which can then be partially hydrolyzed by passage through a suitable hydrolytic bath. The resultant pellicle or filament can then be stretched to obtain an oriented material having good tenacity.

The following examples, in which proportions are in parts by weight unless otherwise specified, are given for illustrative purposes and are not intended to place any restrictions on the herein described invention.

Example I

Six hundred (600) parts of a solid, macromolecular acrylonitrile/vinyl acetate interpolymer, in which the mol ratio of acrylonitrile to vinyl acetate was 1.6:1, was agitated with 1700 parts of acetone and the resultant solution was then filtered to remove traces of undissolved material. Fibers were then formed by the dry spinning of this solution through a conventional acetate spinner, the spinneret of which consisted of 16 holes each having a diameter of 0.08 mm. The resulting yarn which had a denier of 320 was twisted and wound on a small bobbin. The yarn was then placed for a period of approximately 30 minutes in a methanol solution containing 2% of sodium hydroxide at a temperature of 35° C. to 40° C. The bobbin with the yarn was then removed from the methanol alkali solution, washed thoroughly with water and dried. The nitrile groups of the interpolymer were substantially unaffected by this treatment, whereas a substantial proportion (25%–50%) of the acetate groups thereof were hydrolyzed to hydroxyl groups. The fibers were oriented by drawing at a ratio of 2.2:1 while heated at approximately 100° C. in a mineral oil bath. The fibers thus obtained had a tensile strength of about 2.5 g./d. at 16% elongation, a loop tenacity of 1.45 g./d. at 5% elongation, a wet tenacity of 1.5 g./d. at 24% elongation, a 90% recovery from an 8% stretch and an elastic modulus of 46 g./d. The fibers were both insoluble in and not swollen by acetone. The resulting yarn had a sticking temperature of approximately 160° C. to 200° C. and a sample which was exposed outdoors for a period of 6 months showed no loss in tensile strength.

Example II

Fibers, prepared by dry spinning of the acetone solution of acrylonitrile/vinyl acetate interpolymer as described in the above example, were hydrolyzed by treatment at 55° C. for ten minutes in a methanol solution containing 2% sodium hydroxide after soaking for approximately two days in a dilute aqueous ammonium hydroxide solution. The hydrolyzed acrylonitrile/vinyl acetate fibers, in which the nitrile groups were substantially unaffected and in which from 25% to 50% of the acetate groups had been converted to hydroxyl groups, were dried and oriented by drawing through a radiant heater, maintaining a peripheral speed differential of the drawing rolls at about five times that of the feed rolls. The fibers thus obtained had a tenacity of 3.1 g./d. at 14% elongation.

Example III

To a vessel fitted with a mechanical stirrer, dropping funnel, and condenser set for distillation were added 1.6 parts concentrated sulfuric acid and 79 parts methanol. The solution was heated to boiling on a steam bath and then 100 parts of an aqueous dispersion of acrylonitrile/vinyl acetate interpolymer (mol ratio 1.95:1) containing 32% solids were added dropwise over a period of 0.5 hr. The reaction mixture was then heated to a temperature of 85°–90° C. and methyl alcohol and methyl acetate distilled at the rate of about 110 parts per hour. Additional methanol was added as the distillation proceeded to maintain a volume of about 150 parts in the reaction flask. After five hours the product was collected on a filter, washed with methanol and air-dried. It was soluble in both acetone and dimethylformamide. Saponification number indicated that 53% of the acetate groups were replaced by hydroxyl groups but that substantially none of the nitrile groups had been affected.

Example IV

To a flask fitted with a mechanical stirrer, dropping funnel and reflux condenser were added 100 parts of an aqueous dispersion of acrylonitrile/vinyl acetate interpolymer (mol ratio 1.95:1) containing 32% solids. The dispersion was heated to a temperature of 85°–90° C. and then 2 parts concentrated sulfuric acid and 12 parts methanol were added and the mixture refluxed for 0.5 hour. The condenser was set for distillation and the mixture distilled at the rate of about 72 parts per hour for six hours. As the distillation proceeded, additional methanol was added to maintain a constant volume in the reaction flask. Over the six hour period 400 parts methanol were added. The product was collected on a filter, washed with methanol and air-dried. It was insoluble in acetone but soluble in dimethylformamide. Saponification number indicated that 71% of the acetate groups were replaced by hydroxyl groups and that substantially none of the nitrile groups were affected.

While this invention has been illustrated with particular reference to interpolymers of acrylonitrile with vinyl acetate, it is to be understood that it is broadly applicable to solid, macromolecular interpolymers of acrylonitrile with vinyl esters of organic monocarboxylic acids having the general formula R'COOH, wherein R' is of the group consisting of hydrogen atoms and hydrocarbon radicals, free from unsaturated linkages between acyclic carbon atoms, in which any carbon atom alpha to the carbon atom in the carboxyl group of said acid is attached to at least one but not more than three carbon atoms. Included among examples of said interpolymers are interpolymers of acrylonitrile with vinyl formate, vinyl acetate, vinyl propionate, vinyl benzoate, vinyl butyrate, vinyl heptanoate, vinyl stearate, vinyl cyclohexanoate, vinyl isobutyrate, vinyl palmitate, vinyl myristate, vinyl toluate, vinyl naphthoate and the like. Partially hydrolyzed interpolymers having optimum properties are obtained most readily when the interpolymer subjected to partial hydrolysis is an interpolymer of acrylonitrile with a vinyl ester of an acid having the general formula

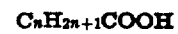

$$C_nH_{2n+1}COOH$$

wherein $n$ is a positive integer within the range of from 1 to 6. Inasmuch as the acid group of from 15% to 75% of the vinyl ester is removed by hydrolysis, it is usually most economical to use an interpolymer of acrylonitrile with vinyl acetate which is the most readily available vinyl ester.

The acrylonitrile/vinyl organic ester interpolymers for use in this invention are conveniently prepared as follows: One hundred parts by weight of a mixture of acrylonitrile and a vinyl organic ester, e. g., of a mixture of equal parts by weight of acrylonitrile and vinyl acetate, are added with stirring to a solution consisting of 1400 parts by weight of water, 2 parts of ammonium persulfate, and 0.4 part of sodium bisulfite in a glass reactor equipped with a stirrer, nitrogen inlet, and a reflux condenser. Stirring of the resultant mixture is continued while said mixture is maintained at a temperature of about 35° C. for a period of about 3 hours, whereupon the copious precipitate of interpolymer formed is filtered off, washed well with water and dried. The preparation of acrylonitrile/vinyl organic ester interpolymers is more completely described in copending U. S. applications Serial No. 458,711, filed September 17, 1942, and Serial No. 497,056, filed August 2, 1943.

The molecular proportions of acrylonitrile to vinyl organic ester in the interpolymer subjected to partial hydrolysis in accordance with this invention may vary within relatively wide limits depending upon the properties described in the partially hydrolyzed product. However, the mol ratio of acrylonitrile to vinyl organic ester should be within the range of from 1:10 to 10:1. Acrylonitrile/vinyl organic ester interpolymers in which said mol ratio is greater than 10:1 are insoluble in solvents such as acetone and hence may not be dry spun from acetone solution prior to partial hydrolysis. Furthermore, the resulting partially hydrolyzed interpolymers obtained when the mol ratio of acrylonitrile to vinyl organic ester in the interpolymer subjected to partial hydrolysis is greater than 10:1 are insoluble in dimethyl formamide, and hence cannot be readily converted to shaped articles such as filaments, fibers, films and the like. On the other hand, interpolymers in which said ratio is less than 1:10 upon partial hydrolysis give rise to polymeric articles which are sensitive to moisture. Preferred interpolymers are those in which said mol ratio is within the range of from 1:3 to 3:1, since said interpolymers upon partial hydrolysis yield products which can be most easily treated to give oriented pellicles and filaments.

The acrylonitrile/vinyl ester interpolymers employed in this invention can be partially hydrolyzed by any procedure which will effect partial hydrolysis of solid, macromolecular homopolymers of the vinyl ester contained therein. Said partial hydrolysis may be effected either before or after the acrylonitrile/vinyl organic ester interpolymer is shaped. For instance, the interpolymer may be dissolved, as in acetone, and dry spun to provide filaments, fibers or sheets which are subsequently partially hydrolyzed as such. Alternatively, the interpolymer after separation from the polymerization mixture may be partialy hydrolyzed, dissolved in dimethylformamide and then converted into shaped articles by dry spinning the resultant solution. Again, an aqueous dispersion of acrylonitrile/vinyl organic ester, such as is obtained upon the interpolymerization of acrylonitrile and vinyl acetate, as described in copending U. S. applications Serial No. 458,711, filed September 17, 1942 and Serial No. 497,056, filed August 2, 1943, may be hydrolyzed in situ. The resulting partially hydrolyzed product may be precipitated as by the addition of a salt and then dissolved in dimethylformamide and dry spun to form the desired shaped article.

As hereinbefore stated, partial hydrolysis may be effected either before or after an interpolymer is formed into a shaped article. Said partial hydrolysis is brought about by immersing the interpolymer in a hydrolyzing bath such as an aqueous or alcoholic solution of a catalyst, preferably heating the interpolymer in a hydrolyzing bath comprising the catalyst, water and a primary alcohol that is liquid at 25° C. The most suitable alcohols are methyl alcohol and ethyl alcohol, but higher alcohols such as propyl, butyl and isobutyl alcohol may also be used to advantage.

Any catalyst adapted to promote partial hydrolysis of a solid, macromolecular homopolymer of a vinyl ester of an organic monocarboxylic acid having the general formula R'COOH, as hereinbefore defined, is also adapted to promote partial hydrolysis of a solid, macromolecular interpolymer of acrylonitrile with said monomeric vinyl ester. On account of the superior products thereby obtained, partial hydrolysis is preferably effected in the presence of an acid catalyst, such as sulfuric acid, phosphoric acid, p-toluenesulfonic acid, hydrochloric acid and the like. Partial hydrolysis can also be effected by straight saponification with an excess of alkali or it can be carried out with only a small amount of alkali to act as an ester interchange or alcoholysis catalyst. Sodium hydroxide is a very satisfactory alkali to use because of its commercial availability and cheapness, but potassium hydroxide and other alkaline materials can also be used with success. However, when partial hydrolysis is effected in the presence of an alkaline catalyst, care must be taken, in the event any nitrile groups are affected thereby, to acidify the resultant product.

In general the catalyst is employed at a temperature of 25°–100° C., depending on the medium. The concentration of catalyst is usually within the range of from 1% to 10% by weight based on the weight of liquid medium present.

The partial hydrolysis of the aforementioned interpolymer may be represented by the following equation:

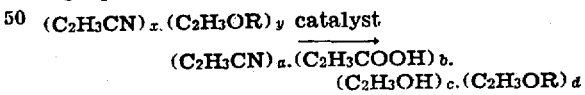

in which R is an acyl radical of an acid having the general formula R'COOH, as hereinbefore defined, and $x$, $y$, $a$, $b$, $c$ and $d$ are numbers, $x=a+b$, $y=c+d$ and the ratio of $x$ to $y$ is within the range of from 1:10 to 10:1. While the hydrolyzing conditions should be sufficiently severe as to insure that the ratio of $c$ to $d$ in the resultant product is at least 3:17 (i. e., at least 15% of the ester groups is hydrolyzed), it is essential that said conditions should not be so severe as to effect hydrolysis of more than 25% of the nitrile groups or more than 75% of the ester groups, i. e., the ratio of $a$ to $b$ in the finished product must be at least 3:1 and the ratio of $c$ to $d$ must not be greater than 3:1.

As hereinbefore stated, the novel products of this invention are macromolecular, soluble in dimethylformamide, have substantial wet strength when in the form of an untreated pellicle and have the empirical formula

in which R is an acyl radical of an acid having the general formula R'COOH, wherein R' is of the group consisting of hydrogen atoms and hydrocarbon radicals, free from any unsaturated linkage between acyclic carbon atoms, in which any carbon atom alpha to the carbon atom in the carboxyl group of said acid is attached to at least one but not more than three carbon atoms and $a$, $b$, $c$ and $d$ are numbers, the ratio of $a+b$ to $c+d$ being within the range of from 1:10 to 10:1, the ratio of $a$ to $b$ being at least 3:1 and the ratio of $c$ to $d$ being within the range of from 3:17 to 3:1.

Partially hydrolyzed interpolymers having the empirical formula $(C_2H_3CN)_a.(C_2H_3COOH)_b.(C_2H_3OH)_c.(C_2H_3OR)_d$ as hereinbefore defined, in which R has the general formula

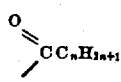

wherein $n$ is a positive integer within the range of from 1 to 6, have optimum properties and are obtained most readily. Partially hydrolyzed interpolymers in which R is

are obtained most economically and are, therefore, preferred in most instances.

The ratio of $a+b$ to $c+d$ in the products having the hereinbefore defined empirical formula $(C_2H_3CN)_a.(C_2H_3COOH)_b.(C_2H_3OH)_c.(C_2H_3OR)_d$ may be as low as 1:10 and may be as high as 10:1. Products in which said ratio is less than 1:10 are to be avoided since they are sensitive to moisture; and products in which said ratio is greater than 10:1 are also to be avoided since they are largely insoluble in dimethylformamide and other organic solvents and hence cannot be readily converted to shaped articles. Oriented pellicles and filaments having maximum strength are obtained from the hereinbefore defined products when the ratio of $a+b$ to $c+d$ is within the range of from 1:3 to 3:1.

The ratio of $a$ to $b$ in the products having the hereinbefore defined empirical formula $(C_2H_3CN)_a.(C_2H_3COOH)_b.(C_2H_3OH)_c.(C_2H_3OR)_d$ must be at least 3:1. Products in which said ratio is less than 3:1 are to be avoided since they are quite sensitive to alkaline reagents and are insoluble in substantially all organic solvents. Products having markedly superior properties are those having the hereinbefore defined empirical formula in which $b$ is substantially zero.

As hereinbefore stated, the ratio of $c$ to $d$ in the products of this invention, having the hereinbefore defined empirical formula $(C_2H_3CN)_a.(C_2H_3COOH)_b.(C_2H_3OH)_c.(C_2H_3OR)_d$ must be within the range of from 3:17 to 3:1. Products in which said ratio is less than 3:17 do not differ markedly from the unhydrolyzed interpolymer and are, therefore, to be avoided; while those in which the said ratio is greater than 3:1 are insoluble in dimethylformamide. All of the products in which said ratio is not greater than 3:1 are soluble in dimethylformamide and may be dyed with acetate and direct dyes; while those in which said ratio is less than 1:1 are also soluble in acetone. Products in which said ratio is within the range of from 1:1 to 3:1 are preferred for the production of filaments and pellicles since they can be dyed most readily and provide filaments and pellicles having maximum strength and relatively higher softening points.

It is to be understood that the hereinbefore defined formula of the products of this invention, namely $(C_2H_3CN)_a.(C_2H_3COOH)_b.(C_2H_3OH)_c.(C_2H_3OR)_d$ is an empirical formula. Structurally, the partially hydrolyzed products represented by this formula are believed to consist of long chains made up of methylene, CH(CN), CH(OR), CH(COOH) and CH(OH) groups, the ratio of the methylene groups to the sum of the remaining groups being substantially 1:1.

It is to be understood that the shaped, partially hydrolyzed acrylonitrile/vinyl organic ester interpolymer articles prepared in accordance with this invention should be subjected to stretching. This is particularly true in the case of filaments, fibers and pellicles. The shaped filament, fiber or pellicle had by shaping the interpolymer and then partially hydrolyzing it, or by partially hydrolyzing the interpolymer and then shaping it, is stretched as by passing it between feeding rolls and drawing rolls while maintaining the drawing rolls at a higher peripheral speed than the feeding rolls. This stretching of the filament, fiber or pellicle of the partially hydrolyzed acrylonitrile/vinyl organic ester interpolymer provides a shaped article in which the molecules are oriented along the longitudinal axis of the filament, fiber or pellicle, said shaped article having greatly enhanced strength and tenacity. In the preparation of filaments and fibers the peripheral speed of the drawing rolls is preferably at least twice that of the feeding rolls, i. e., the filament or fiber is stretched to at least twice its original length, in view of the fact that said stretching increases tensile strength and tenacity manyfold.

After-treatments upon the partially hydrolyzed acrylonitrile/vinyl organic ester interpolymers of this invention may be carried out to increase the softening temperature of the material. For this purpose, crosslinking agents such as the methylolureas, formaldehyde, polybasic acids or diisocyanates may be employed; and the partially hydrolyzed products can be further insolubilized by treatment with various polyfunctional reagents reactive with hydroxyl groups.

While this invention has been described with particular reference to interpolymers of acrylonitrile with certain vinyl organic esters, it is contemplated that interpolymers of acrylonitrile with a vinyl acetal or ether or other polymerizable vinyl compound which upon hydrolysis of the polymerized material gives rise to polymers having alcoholic hydroxyl groups, may be used.

The products of this invention possess advantages not previously combined in a polymeric material. For instance, they are useful vinyl interpolymers containing substantial amounts of hydroxyl and nitrile groups. Furthermore, the partially hydrolyzed interpolymers of this invention are substantially insensitive to water. Furthermore, oriented filaments, fibers and pellicles of said partially hydrolyzed interpolymers are resistant to high temperatures and are substantially unaffected by outdoor exposure. Said partially hydrolyzed interpolymers may be had in many shapes adapted for many uses. For example, films or pellicles suitable for wrapping purposes may be prepared. Filaments and fibers for use in fabrics or for many other purposes may be obtained. In addition to these uses, compositions of interest in molding applications may be obtained.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. A macromolecular, partially hydrolyzed interpolymer of acrylonitrile with a vinyl ester of organic monocarboxylic acid, said partially hydrolyzed interpolymer being soluble in dimethylformamide, having substantial wet strength when in the form of an untreated pellicle and having the empirical formula $$(C_2H_3CN)_a.(C_2H_3COOH)_b.(C_2H_3OH)_c.(C_2H_3OR)_d$$

in which R is an acyl radical of an acid having the general formula R'COOH, wherein R' is of the group consisting of hydrogen atoms and hydrocarbon radicals, free from any unsaturated linkage between acyclic carbon atoms, in which any carbon atom alpha to the carbon atom in the carboxyl group of said acid is attached to at least one but not more than three carbon atoms and $a$, $b$, $c$ and $d$ are numbers, the ratio of $a+b$ to $c+d$ being within the range of from 1:10 to 10:1, the ratio of $a$ to $b$ being at least 3:1 and the ratio of $c$ to $d$ being within the range of from 3:17 to 3:1.

2. A product as defined in claim 1 wherein R is an acyl radical of an acid having the general formula $C_nH_{2n+1}COOH$, in which $n$ is a positive integer within the range of from 1 to 6.

3. A macromolecular, partially hydrolyzed interpolymer of acrylonitrile with vinyl acetate, said hydrolyzed interpolymer being soluble in dimethylformamide, having substantial wet strength when in the form of an untreated pellicle and having the empirical formula

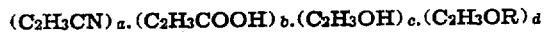

wherein $a$, $b$, $c$ and $d$ are numbers, the ratio of $a+b$ to $c+d$ being within the range of from 1:10 to 10:1, the ratio of $a$ to $b$ being at least 3:1 and the ratio of $c$ to $d$ being within the range of from 3:17 to 3:1.

4. A product as defined in claim 3 wherein $b$ is substantially zero.

5. A macromolecular, partially hydrolyzed interpolymer of acrylonitrile with vinyl acetate, said hydrolyzed interpolymer being soluble in dimethylformamide, having substantial wet strength when in the form of an untreated pellicle and having the empirical formula

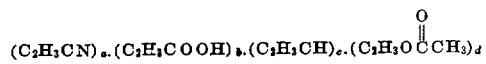

wherein $a$, $b$, $c$ and $d$ are numbers, the ratio of $a+b$ to $c+d$ being within the range of from 1:3 to 3:1, $b$ being substantially zero and the ratio of $c$ to $d$ being within the range of from 1:1 to 3:1.

6. A filament comprising essentially a partially hydrolyzed interpolymer of acrylonitrile with a vinyl ester of an organic monocarboxylic acid as defined in claim 1.

7. A filament comprising essentially a partially hydrolyzed interpolymer of acrylonitrile with vinyl acetate as defined in claim 3.

8. A filament comprising essentially a partially hydrolyzed interpolymer of acrylonitrile with vinyl acetate as defined in claim 5, said filament showing orientation along the filament axis.

9. A pellicle comprising essentially a partially hydrolyzed interpolymer of acrylonitrile with a vinyl ester of an organic monocarboxylic acid as defined in claim 1.

10. A pellicle comprising essentially a partially hydrolyzed interpolymer of acrylonitrile with vinyl acetate as defined in claim 3.

11. A pellicle comprising essentially a partially hydrolyzed interpolymer of acrylonitrile with vinyl acetate as defined in claim 5, said pellicle showing orientation along the pellicle axis.

12. A macromolecular, partially hydrolyzed interpolymer of acrylonitrile with vinyl acetate, said hydrolyzed interpolymer being soluble in dimethylformamide, having substantial wet strength when in the form of an untreated pellicle and having the empirical formula:

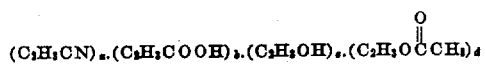

wherein $a$, $b$, $c$ and $d$ are numbers, the ratio of $a+b$ to $c+d$ is 1.95:1, $b$ is substantially zero and the ratio of $c$ to $d$ is within the range of from 1:1 to 3:1.

ALBERT F. SMITH.
HALSEY B. STEVENSON.

REFERENCES CITED

The following references are of record in the file of this patent:

UNITED STATES PATENTS

| Number | Name | Date |
|---|---|---|
| 2,118,863 | Reppe | May 31, 1938 |
| 2,118,864 | Reppe | May 31, 1938 |
| 2,332,899 | D'Alelio | Oct. 26, 1943 |
| 2,388,851 | Kenyon | Nov. 13, 1945 |
| 2,403,464 | Smith | July 9, 1946 |

FOREIGN PATENTS

| Number | Country | Date |
|---|---|---|
| 387,976 | Great Britain | Feb. 16, 1933 |

OTHER REFERENCES

D'Alelio, "Laboratory Manual of Plastics and Synthetic Resins," page 60 (1943).

Certificate of Correction

Patent No. 2,566,255                                                  August 28, 1951

ALBERT F. SMITH ET AL.

It is hereby certified that error appears in the printed specification of the above numbered patent requiring correction as follows:

Column 9, line 47, for that portion of the formula reading "$(C_2H_5CH)_6$." read $(C_2H_5OH)_6$;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*

Certificate of Correction

Patent No. 2,566,255                                                August 28, 1951

ALBERT F. SMITH ET AL.

It is hereby certified that error appears in the printed specification of the above numbered patent requiring correction as follows:

Column 9, line 47, for that portion of the formula reading "$(C_2H_5CH)_o.$" read $(C_2H_5OH)_e.$;

and that the said Letters Patent should be read as corrected above, so that the same may conform to the record of the case in the Patent Office.

Signed and sealed this 23rd day of October, A. D. 1951.

[SEAL]

THOMAS F. MURPHY,
*Assistant Commissioner of Patents.*